United States Patent
Mitchell

(10) Patent No.: US 11,746,934 B2
(45) Date of Patent: Sep. 5, 2023

(54) WOVEN IRRIGATION TUBING

(71) Applicant: Delta Plastics of the South, Little Rock, AR (US)

(72) Inventor: Michael Mitchell, Little Rock, AR (US)

(73) Assignee: Delta Plastics of the South, Little Rock, AR (US)

(*) Notice: Subject to any disclaimer, the term of this patent is extended or adjusted under 35 U.S.C. 154(b) by 109 days.

(21) Appl. No.: 17/536,029

(22) Filed: Nov. 28, 2021

(65) Prior Publication Data
US 2022/0082187 A1 Mar. 17, 2022

Related U.S. Application Data

(63) Continuation of application No. PCT/US2019/050714, filed on Sep. 12, 2019.
(Continued)

(51) Int. Cl.
*F16L 11/08* (2006.01)
*B32B 27/08* (2006.01)
(Continued)

(52) U.S. Cl.
CPC ........ *F16L 11/087* (2013.01); *B29C 48/0018* (2019.02); *B29C 48/0019* (2019.02); *B29C 48/0021* (2019.02); *B29C 48/0022* (2019.02); *B29C 48/0023* (2019.02); *B29C 48/08* (2019.02); *B29C 48/21* (2019.02); *B29C 48/28* (2019.02); *B29C 48/919* (2019.02);
(Continued)

(58) Field of Classification Search
CPC . B32B 1/08; B32B 27/12; B32B 27/32; F16L 9/12; F16L 11/08; F16L 11/087
USPC .......... 138/137, 141, 123–126; 239/542, 547
See application file for complete search history.

(56) References Cited

U.S. PATENT DOCUMENTS 3,830,067 A  8/1974  Osborn
4,139,159 A  2/1979  Inoue
(Continued)

FOREIGN PATENT DOCUMENTS

CN  104500872 A  4/2015
CN  104708874 A  6/2015
(Continued)

*Primary Examiner* — Patrick F Brinson
(74) *Attorney, Agent, or Firm* — David A. Belasco; Belasco Jacobs & Townsley, PC

(57) ABSTRACT

Woven irrigation tubing comprising a woven, extrusion coated & laminated tube formed of a high density polyethylene (HDPE) outer layer, a low density polyethylene (LDPE) middle layer and a linear low density polyethylene (LLDPE) inner layer. The finished tubing is treated for ultraviolet resistance. The tubing is tied off at a distal end with a proximal end connected to a pressurized irrigation source. Watering holes are created in the tubing at spaced intervals and the resulting water streams are directed into parallel plowed furrows. The tubing is completely recyclable. The tubing is formed by manufacturing tape for the woven outer tubing cover, stretching the tape along its length to strengthen it, weaving the outer layer from the tape, flattening the woven outer layer, extrusion coating each surface of the outer layer with LDPE, laminating the LLDPE inner layer to the LDPE, reversing and winding the tubing for storage and distribution.

6 Claims, 15 Drawing Sheets

Related U.S. Application Data

(60) Provisional application No. 62/854,555, filed on May 30, 2019.

(51) Int. Cl.

| | | |
|---|---|---|
| *B32B 27/12* | (2006.01) | |
| *B32B 27/32* | (2006.01) | |
| *B29C 48/00* | (2019.01) | |
| *B29C 48/08* | (2019.01) | |
| *B29C 48/28* | (2019.01) | |
| *D03D 15/46* | (2021.01) | |
| *B29D 23/00* | (2006.01) | |
| *D03D 3/02* | (2006.01) | |
| *D03D 11/00* | (2006.01) | |
| *B29C 48/92* | (2019.01) | |
| *B29C 48/88* | (2019.01) | |
| *B29C 48/21* | (2019.01) | |
| *D03D 15/283* | (2021.01) | |
| *D01D 5/42* | (2006.01) | |
| *D03D 1/00* | (2006.01) | |
| *D03J 1/06* | (2006.01) | |
| *B32B 1/08* | (2006.01) | |
| *B32B 5/02* | (2006.01) | |
| *F16L 11/12* | (2006.01) | |
| *B29K 23/00* | (2006.01) | |
| *B29L 23/00* | (2006.01) | |
| *F16L 11/02* | (2006.01) | |
| *F16L 11/10* | (2006.01) | |

(52) U.S. Cl.
CPC .......... *B29C 48/9135* (2019.02); *B29C 48/92* (2019.02); *B29D 23/00* (2013.01); *B32B 27/08* (2013.01); *B32B 27/12* (2013.01); *B32B 27/32* (2013.01); *D01D 5/426* (2013.01); *D03D 1/00* (2013.01); *D03D 3/02* (2013.01); *D03D 11/00* (2013.01); *D03D 15/283* (2021.01); *D03D 15/46* (2021.01); *D03J 1/06* (2013.01); *B29C 2793/009* (2013.01); *B29C 2793/0036* (2013.01); *B29K 2023/065* (2013.01); *B29K 2023/0625* (2013.01); *B29K 2023/0633* (2013.01); *B29L 2023/00* (2013.01); *B32B 1/08* (2013.01); *B32B 5/024* (2013.01); *B32B 2250/03* (2013.01); *B32B 2250/242* (2013.01); *B32B 2250/40* (2013.01); *B32B 2255/02* (2013.01); *B32B 2255/26* (2013.01); *B32B 2262/0253* (2013.01); *B32B 2307/71* (2013.01); *B32B 2307/72* (2013.01); *B32B 2323/043* (2013.01); *B32B 2323/046* (2013.01); *B32B 2597/00* (2013.01); *D10B 2321/021* (2013.01); *D10B 2505/20* (2013.01); *F16L 11/02* (2013.01); *F16L 11/10* (2013.01); *F16L 11/12* (2013.01)

(56) References Cited

U.S. PATENT DOCUMENTS

| | | | |
|---|---|---|---|
| 4,228,824 A | 10/1980 | Evans | |
| 4,308,896 A | 1/1982 | Davis | |
| 4,478,661 A * | 10/1984 | Lewis | B29C 66/4322 138/119 |
| 6,016,845 A | 1/2000 | Quigley | |
| 6,588,456 B2 | 7/2003 | Jeong | |
| 7,862,873 B2 | 1/2011 | Yankovitz | |
| 7,886,775 B2 | 2/2011 | Masarwa | |
| 9,439,364 B2 | 9/2016 | Yiflach | |
| 9,527,267 B2 | 12/2016 | Gould | |
| 2003/0178082 A1 | 9/2003 | Yamaguchi | |
| 2003/0201345 A1* | 10/2003 | Jeong | B29C 66/135 239/542 |
| 2004/0244858 A1 | 12/2004 | Jeong | |
| 2004/0261876 A1 | 12/2004 | Warren et al. | |
| 2007/0074776 A1* | 4/2007 | Masarwa | F16L 9/17 138/124 |
| 2008/0110519 A1 | 5/2008 | Gorilovskiy | |
| 2008/0251152 A1* | 10/2008 | Masarwa | E03B 1/00 138/125 |
| 2009/0065084 A1* | 3/2009 | Masarwa | B32B 27/08 138/137 |
| 2015/0156975 A1 | 6/2015 | Gould et al. | |
| 2018/0149293 A1* | 5/2018 | Tough | B32B 27/08 |

FOREIGN PATENT DOCUMENTS

| | | |
|---|---|---|
| CN | 105155080 A | 12/2015 |
| IN | 925DE2014 A | 10/2015 |
| JP | 0640787 B2 | 6/1994 |
| WO | 2013057734 A1 | 4/2013 |

* cited by examiner

WOVEN IRRIGATION TUBING

RELATED APPLICATIONS

The instant application is a continuation of Application No. PCT/US19/50714, filed Sep. 12, 2019 and currently pending, which takes priority from U.S. Provisional Application No. 62854555, filed May 30, 2019 and now expired.

FIELD OF INVENTION

This invention relates to the field of crop irrigation and more specifically to recyclable woven plastic irrigation tubing.

BACKGROUND OF THE INVENTION

Various methods have been developed for crop irrigation. Many of these methods involve aerial spraying of water. Spraying irrigation systems have been found to lose as much as 40% of the water sprayed due to evaporation. Drip style irrigation systems have been developed which work with an inclined and furrowed field in which an irrigation tube with spaced drip openings is disposed orthogonally to the furrows and water is pumped into the tube. The amount of pressure which the tubing can accommodate relates to the size of the field that can be irrigated by a single tube. Early irrigation tubing systems were limited to pressures of approximately one foot of head. As this type of irrigation tubing has a finite life, it is desirable that the tubing material be recyclable. While the early tubing systems used polyethylene plastic that is recyclable, later designs the can accommodate higher pressures have been made with polyethylene plastic which is not recyclable. The present invention addresses these problems by providing an irrigation tubing system that can accommodate substantially higher pressures while being manufactured of completely recyclable materials.

It is an objective of the present invention to provide an irrigation tubing system that can accommodate higher operating pressures than presently available systems. It is a further objective to provide a system that has a longer useful life than presently available systems. It is a still further objective of the invention to provide tubing that is easily and economically recyclable. Finally, it is an objective of the present invention to provide an irrigation tubing system is inexpensive to manufacture and easily packaged and shipped.

While some of the objectives of the present invention are disclosed in the prior art, none of the inventions found include all of the requirements identified.

SUMMARY OF THE INVENTION

The present invention addresses all of the deficiencies of prior art woven irrigation tubing inventions and satisfies all of the objectives described above.

Product Specification

A typical embodiment of the Woven Irrigation Tubing is described below:
 Diamond pipe is a woven, extrusion coated & laminated tube made of LLDPE, HDPE and LDPE.
  It is used to move water at 2000 GPM.
  Finished diameter 15" (381 mm)+/- ⅛"
  Lay-flat 23.5" (599 mm), wound on a 3" ID, ¼" thick, 25" wide PVC Core.
  Length of wound roll 2640' (805 m+5/−0)+5/−0 meters
  Three Layer Structure with UV protection.
   Inside layer 20 gsm white LLDPE+/− 2 gsm
   Middle layer 20 gsm White LDPE+/− 2 gsm
   Outside layer 86 gsm 10 thread/inch, oriented HDPE woven seamless fabric+/− 2 gsm These present specifications are not meant to limit the configuration or make-up of the Woven Irrigation Tubing. Similar tubing of a 10" diameter is currently under development and other sizes are contemplated.

Manufacturing Steps
1) Manufacturing tape for woven outer tubing cover
   a) Melting High Density Polyethylene (HDPE) resin
   b) Monitoring pressure and flow with an extruder
   c) Extruding the melted resin through a flat die to form a sheet
   d) Cooling the extruded sheet in a quenching tank
   e) Slitting the cooled sheet with a slitter to form the tape
   f) Stretching the tape along its length using a tentering frame machine to increase longitudinal tape strength
   f) Winding the stretched tape onto storage bobbins with a first winding machine
2) Weaving of outer tubing cover
   a) Loading filled storage bobbins onto loom unwind stations
   b) Threading each tape on the storage bobbins through a circular loom
   c) Using the circular loom to weave the tape from the storage bobbins into a continuous woven seamless tube
   d) Flattening the woven tube with a tubing flattener
   e) Winding the woven tube onto a master storage roll with a second winding machine
3) Extrusion coating/laminating
   a) Using an extrusion coating lamination apparatus to coat a molten middle layer of Low Density Polyethylene (LDPE) resin on the upper and lower surfaces of the flattened, woven tube and laminating an inside layer of Linear Low Density Polyethylene (LLDPE) film onto said middle layer of LDPE, forming upper and lower LLDPE layers
   b) Winding the coated and laminated woven tube onto a roll with a third winding machine
   c) Optionally unwinding tube from the roll, printing a logo or other information on at least one of the upper and lower LLDPE layers
   d) Winding the printed tube onto rolls with a fifth winding machine
4) Reversing and winding of the printed tube
   a) Unwinding the coated and laminated woven printed or unprinted tube from the roll and folding into linked stacks of a first predetermined size
   b) Positioning the linked stacks on a series of support cradles
   c) Opening a distal end of the tube and turning the tube back on itself
   d) Pulling the opened end of the tube over the stacks and the cradles supporting them, turning the tube inside out
   e) Winding the reversed tube onto a roll with a fourth winding machine
   f) Covering the roll with a protective layer for storage and transport An appreciation of the other aims and objectives of the present invention and an understanding of it may be achieved by referring to the accompanying drawings and the detailed description of a preferred embodiment.

DESCRIPTION OF THE DRAWINGS

DETAILED DESCRIPTION OF THE PREFERRED EMBODIMENT (1) FIG. 1 illustrates a typical embodiment of the woven irrigation tubing 10 of the present invention. The tubing 10 is a woven, extrusion coated & laminated tube made of HDPE 14, LDPE 18 and LLDPE 22. It is used to move water at 2000 GPM. The tubing 10 has a finished diameter 15" (381 mm)+/− ⅛". The tubing 10 has a lay-flat width 22 of 23.5" (599 mm) and is wound on a 3" ID, ¼" thick, 25" wide PVC Core 26. The typical length of a wound roll 26 is 2640' (805 m+5/−0)+5/−0 meters. The tubing 10 has a three layer structure with UV protection 30. The inside layer 34 is 20 gsm white LLDPE 22+/− 2 gsm. The middle layer 38 is 20 gsm White LDPE 18+/− 2 gsm. The outside layer 42 is 86 gsm, 10 thread/inch, oriented HDPE 14 woven seamless fabric+/− 2 gsm.

(2) FIGS. 2-16 illustrate the steps for manufacturing the woven irrigation tubing 10. As illustrated in FIGS. 2-7, Manufacturing tape 46 for outside layer 42 includes the following: Melting High Density Polyethylene (HDPE) resin 14. Using instruments 48 to monitor pressure and flow with an extruder 50. Extruding the melted resin 14 through a flat die 54 to form a sheet 58 of HDPE resin 14. Cooling the extruded sheet 58 in a quenching tank 62. Slitting the cooled sheet 58 with a slitter 66 to form the tape 46. Stretching the tape 46 along its length 70 using a tentering frame machine 74 to increase longitudinal tape strength. Winding the stretched tape 46 onto storage bobbins 78 using a first winding machine 52.

As illustrated in FIGS. 8-10, Weaving of outer tubing cover includes the following: Loading filled storage bobbins 78 onto loom unwind stations 82. Threading each tape 46 on the storage bobbins 78 through a circular loom 86. Using the circular loom 86 to weave the tape 46 from the storage bobbins 78 into a continuous woven seamless tube 90. Flattening the woven tube 90 using a tubing flattener 88. Winding the woven tube 90 onto a master storage roll 94 using a second winding machine 92.

Figure 1:
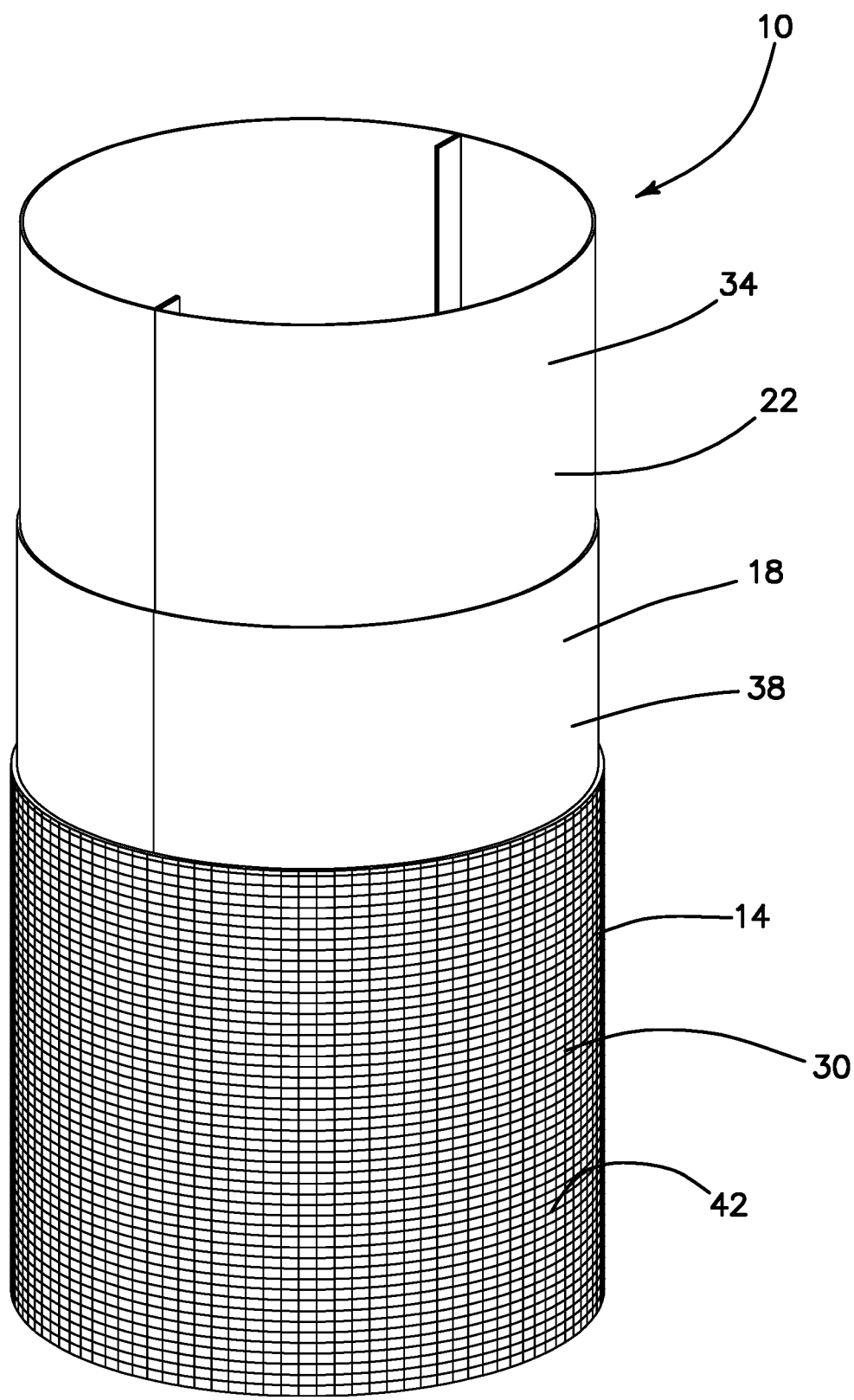
FIG. 1 is a cutaway perspective view of the preferred embodiment of the invention illustrating inner, middle and outer woven layers of the irrigation tubing.
Figure 2:
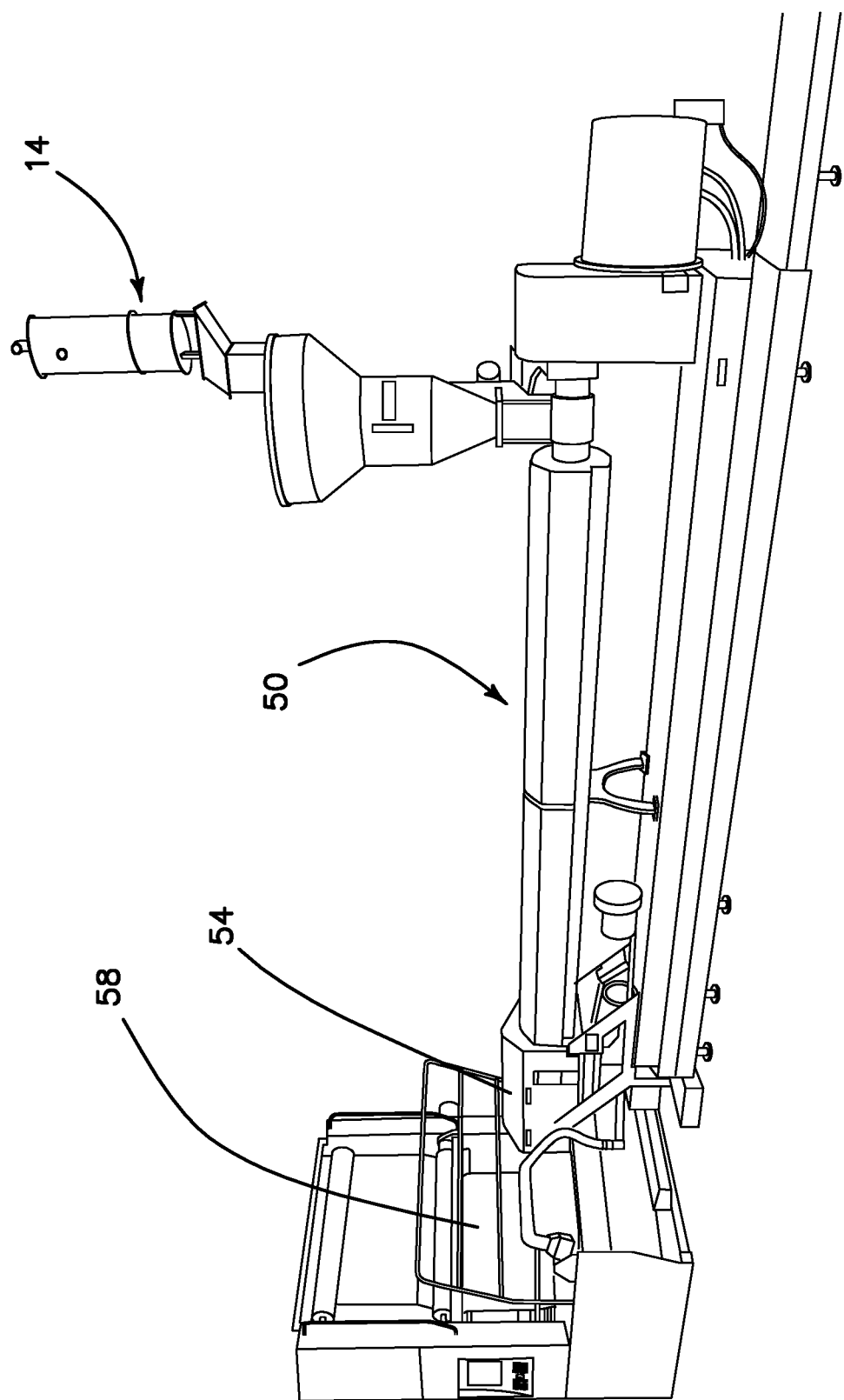
FIG. 2 is a perspective view of an extruder and quenching tank used for fabrication of HDPE tape.
Figure 3:
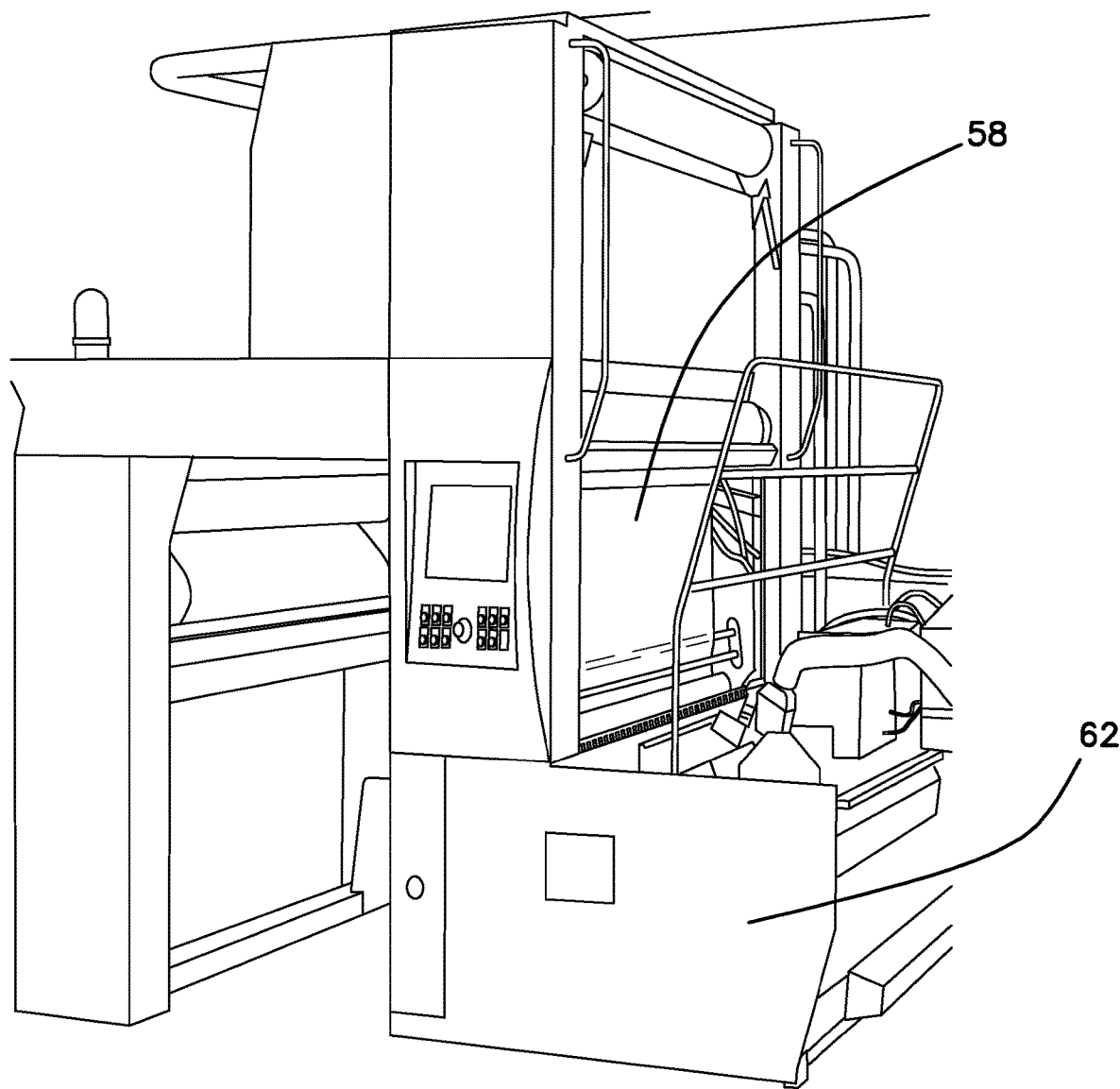
FIG. 3 is a close-up perspective view of the quenching tank and cooled extruded sheet.
Figure 4:
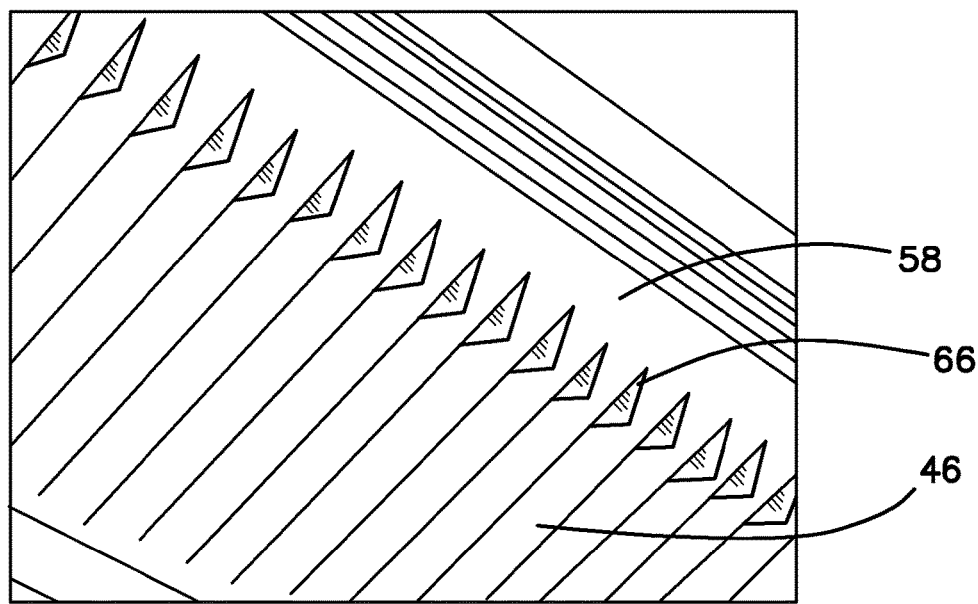
FIG. 4 is a perspective view of a slitting machine for fabrication of the tape from the extruded sheet.
Figure 5:
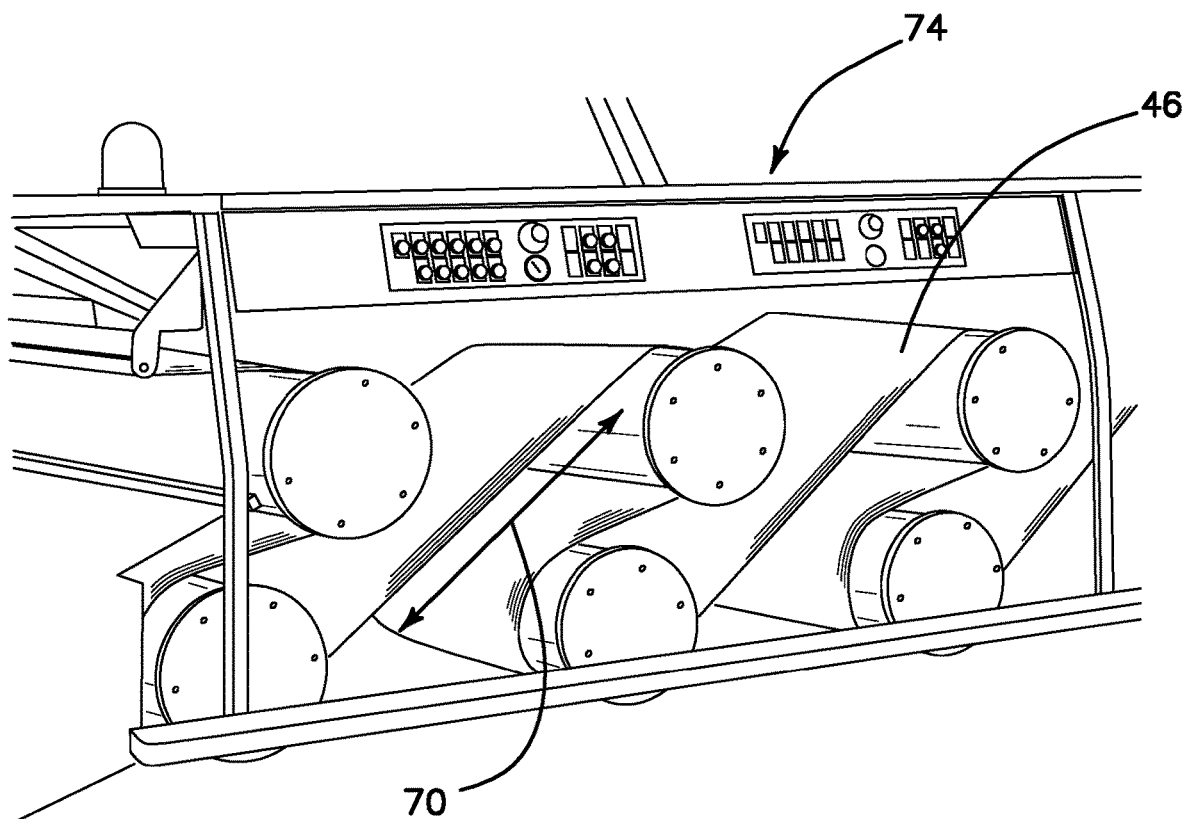
FIG. 5 is a perspective view of a tentering frame used to stretch the tape along its length.
Figure 6:
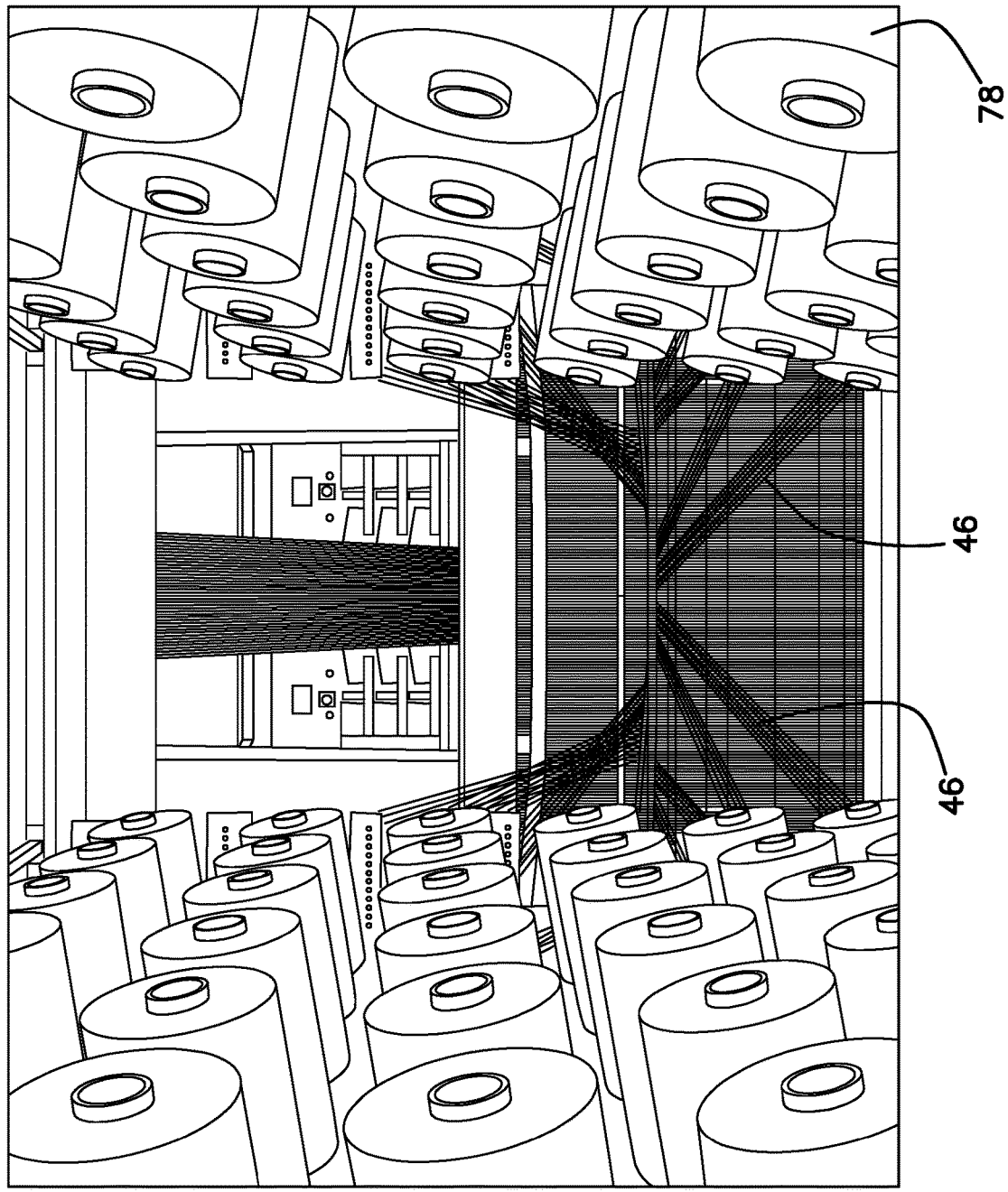
FIG. 6 is a perspective view of the tape being wound on storage bobbins.
Figure 7:
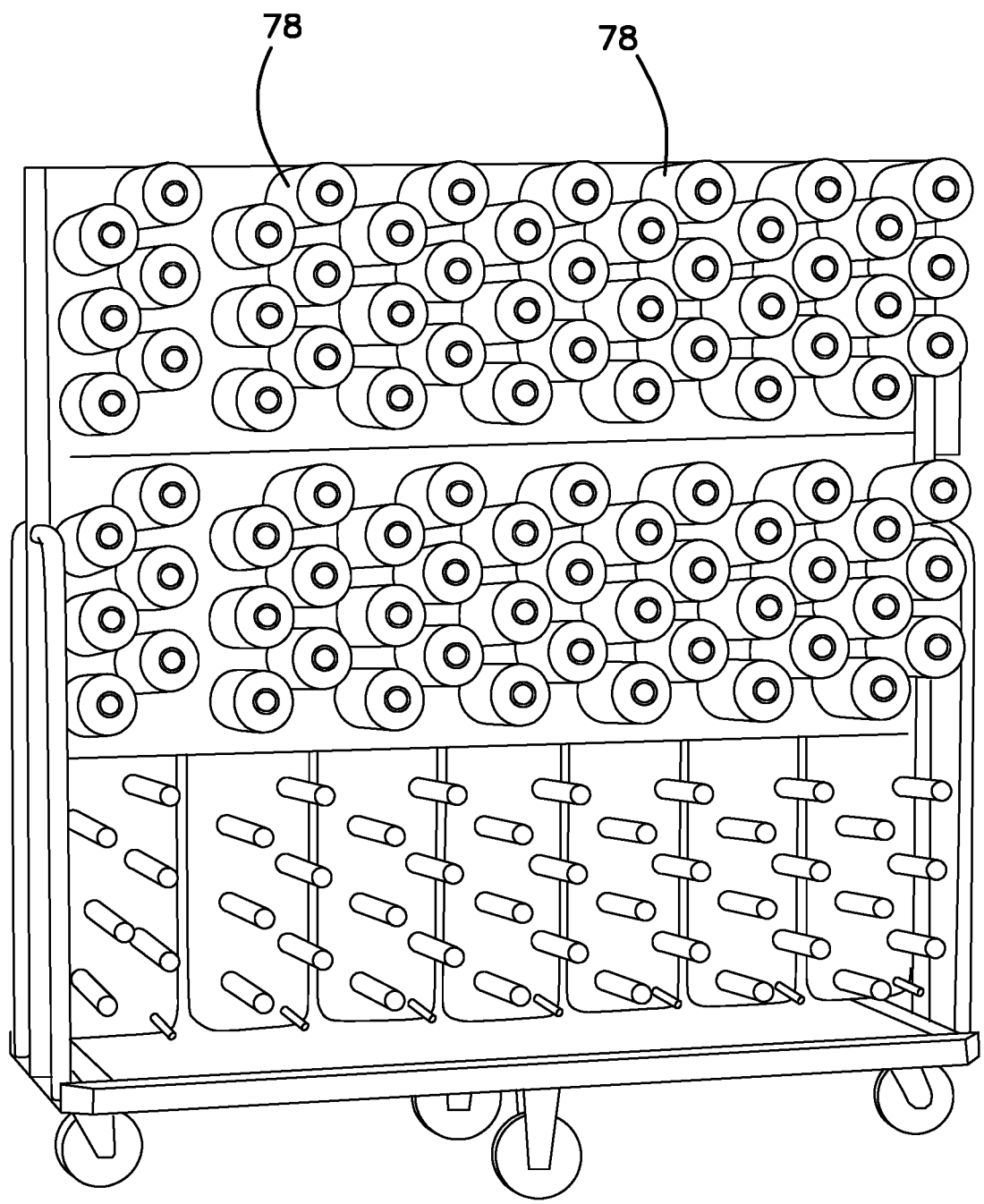
FIG. 7 is perspective view of the bobbins loaded on a storage cart.
Figure 8:
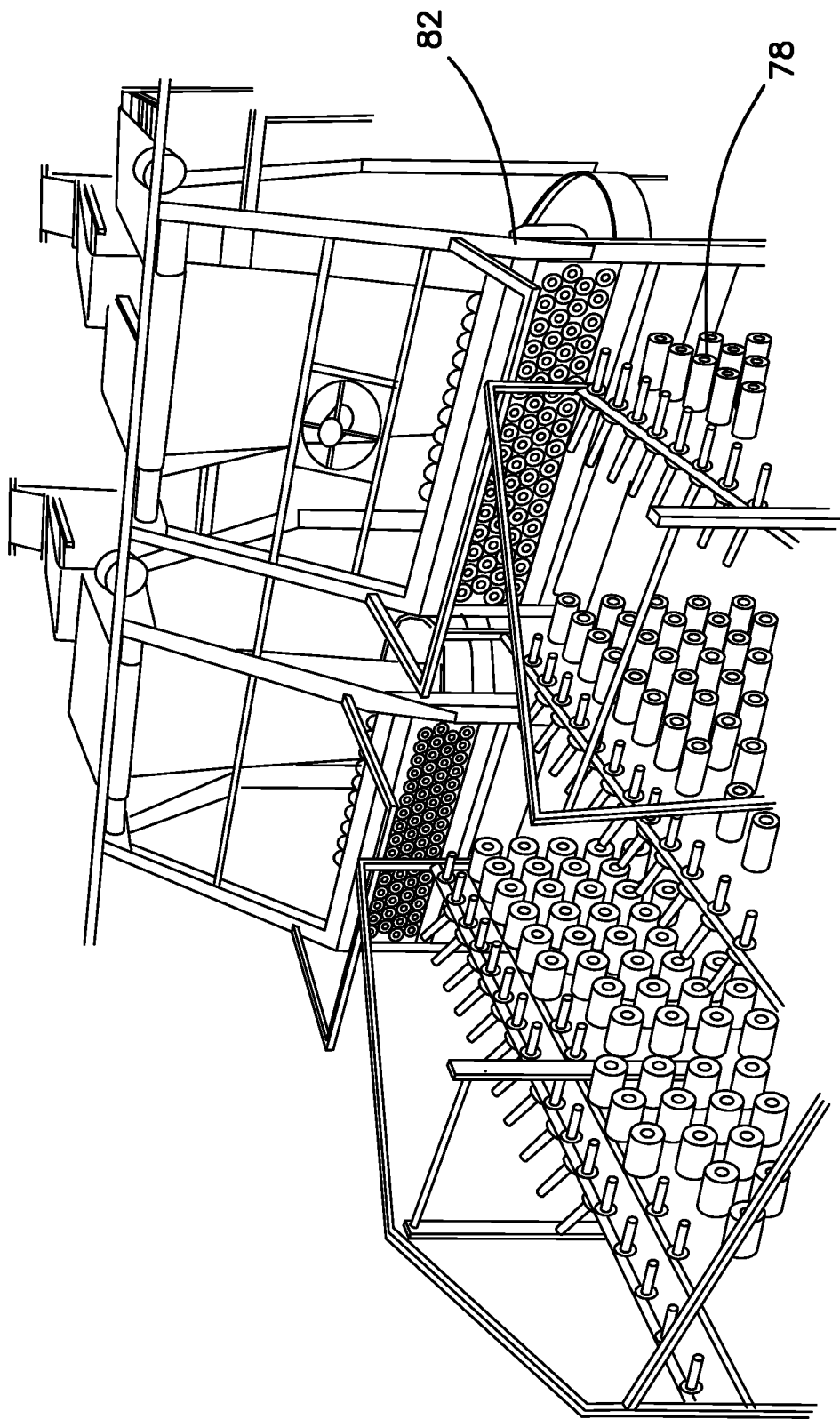
FIG. 8 is a perspective view of the bobbins loaded on loom unwind stations and threaded through a circular loom.
Figure 9:
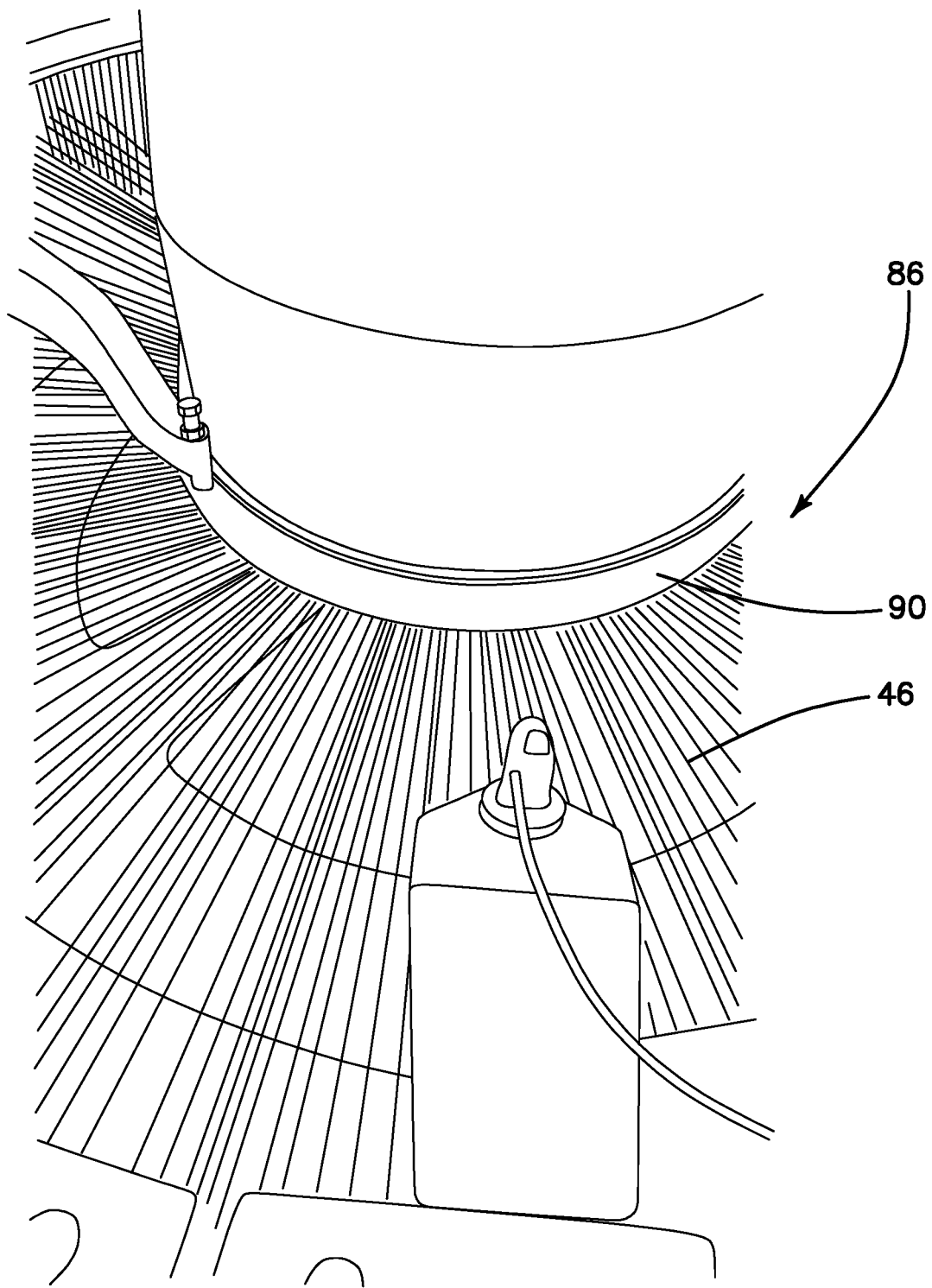
FIG. 9 is a perspective view of the circular loom weaving an outer covering for the irrigation tubing from the HDPE tape.
Figure 10:
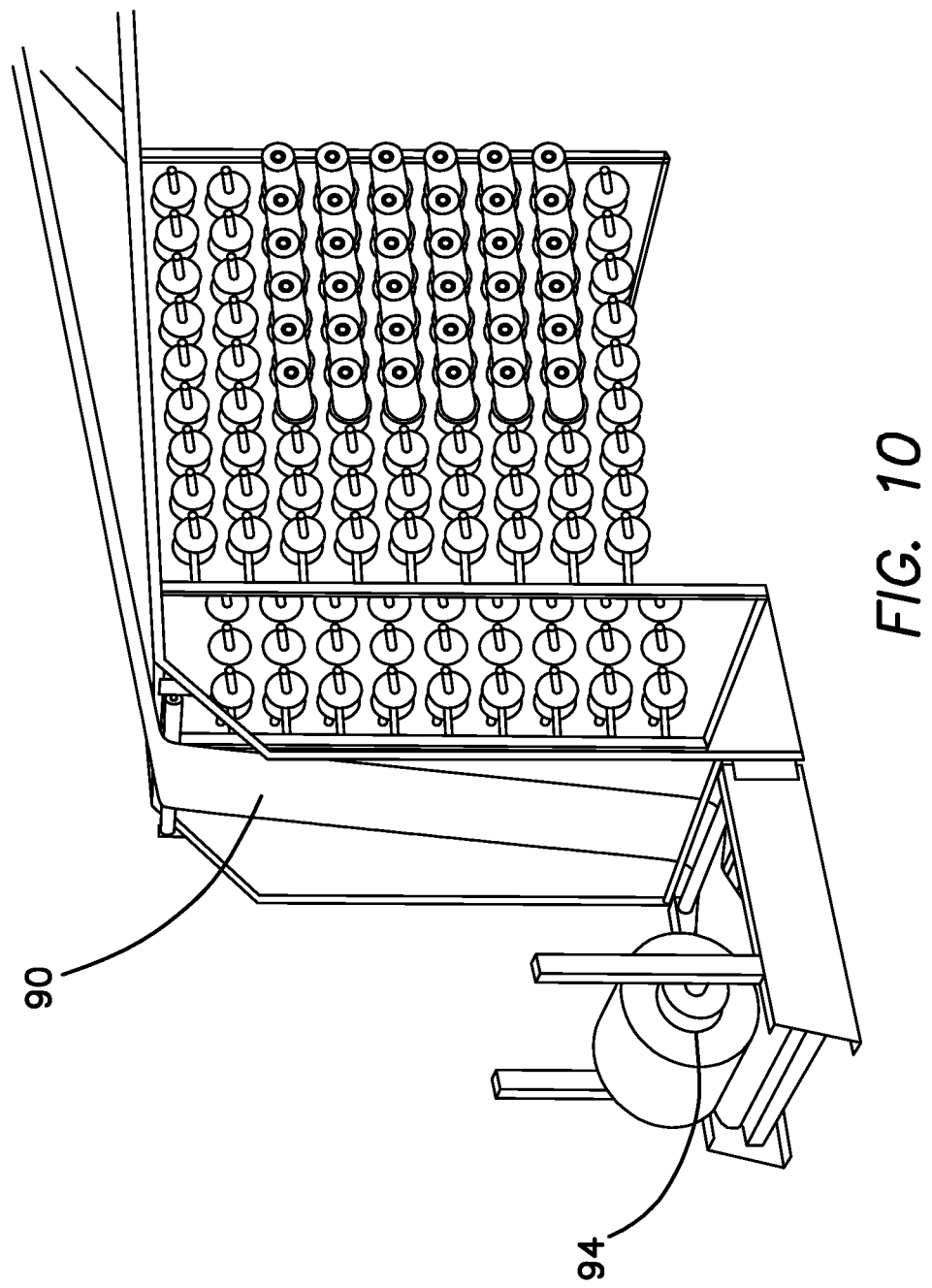
FIG. 10 is perspective view of a winder creating a master roll of flattened tubing for lamination.
Figure 11:
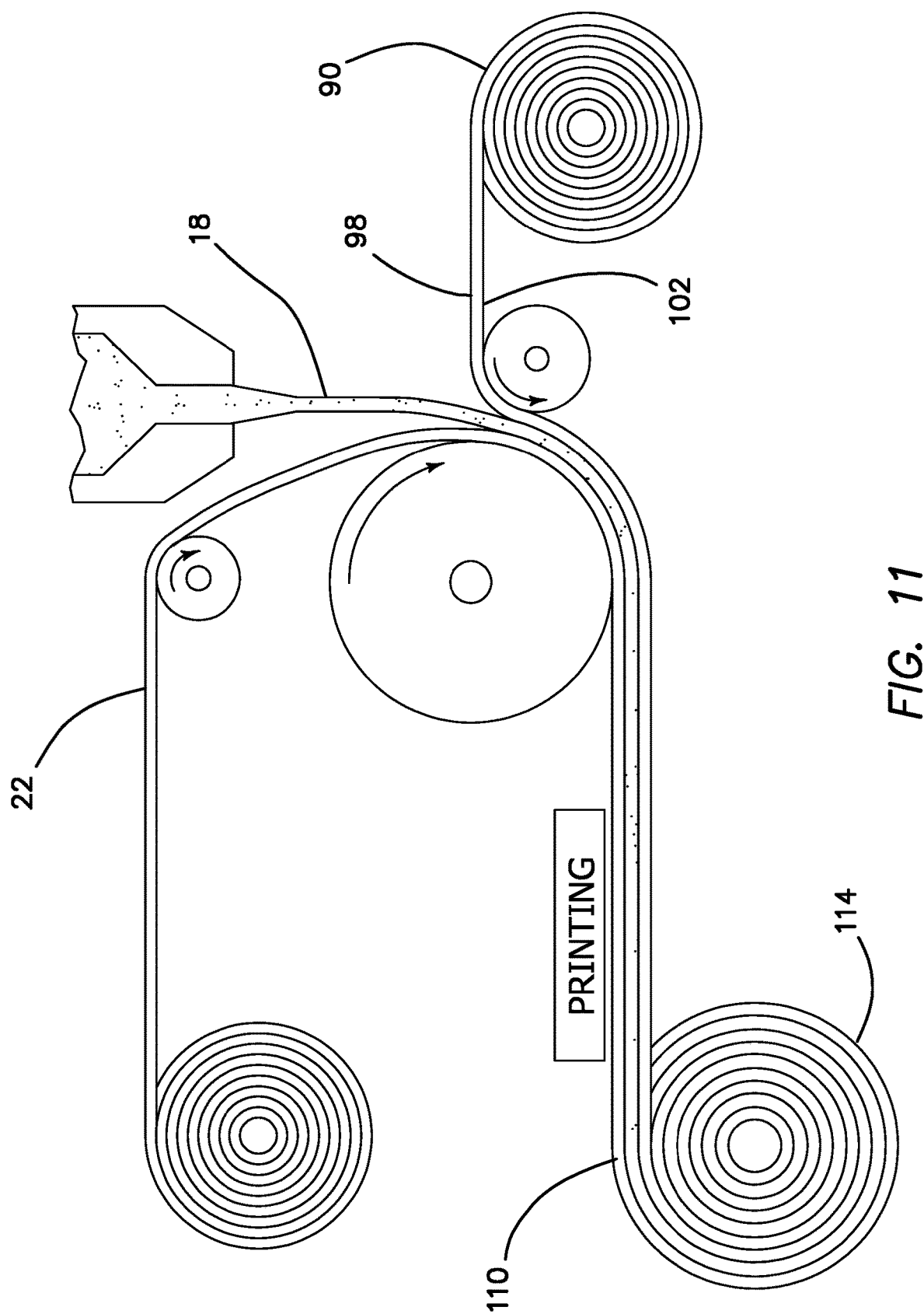
FIG. 11 is a side elevational schematic illustrating lamination of the woven tubing with molten LDPE and a LLDPE layer.
Figure 12:
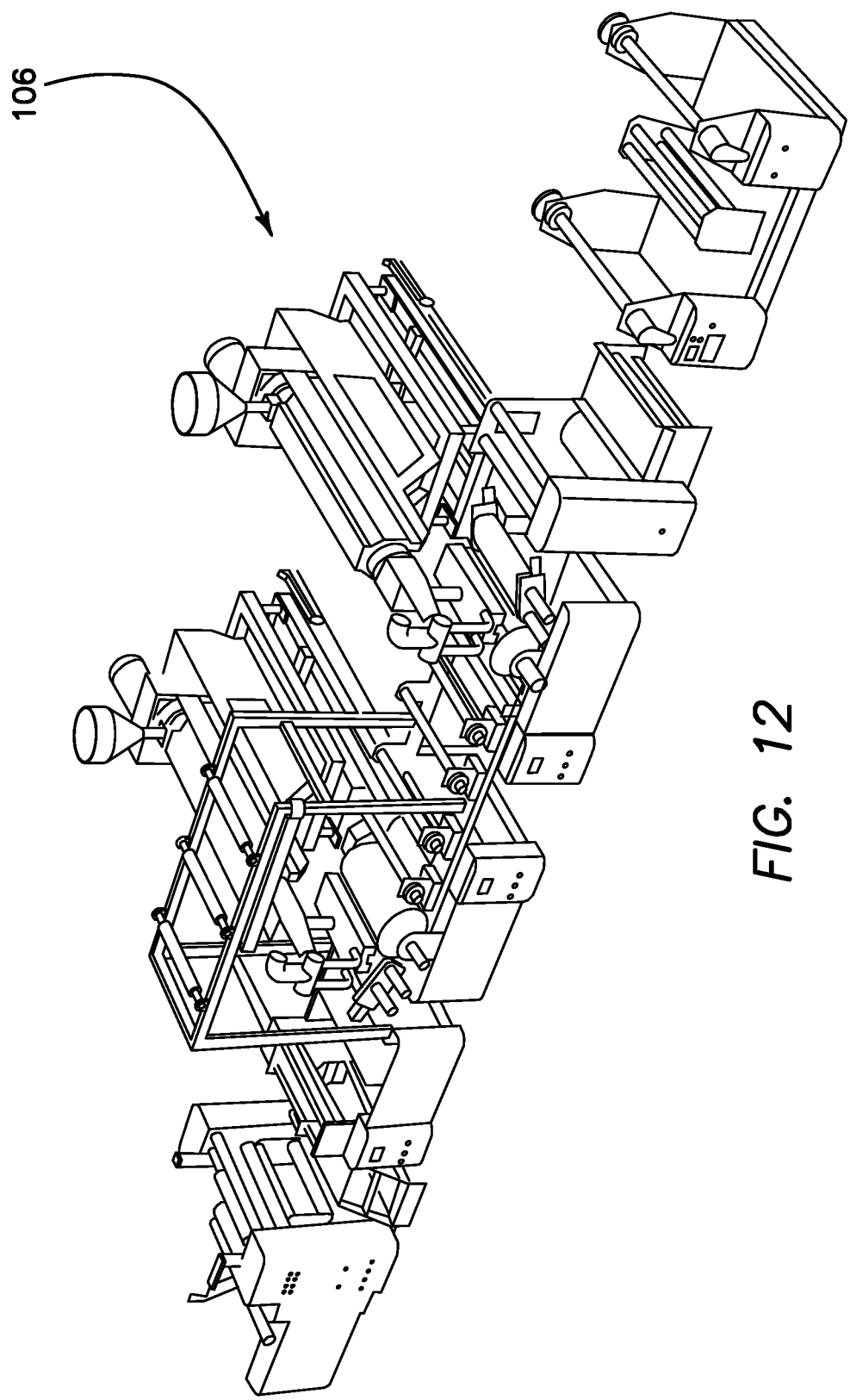
FIG. 12 is a perspective view of the extrusion coating lamination line.
Figure 13:
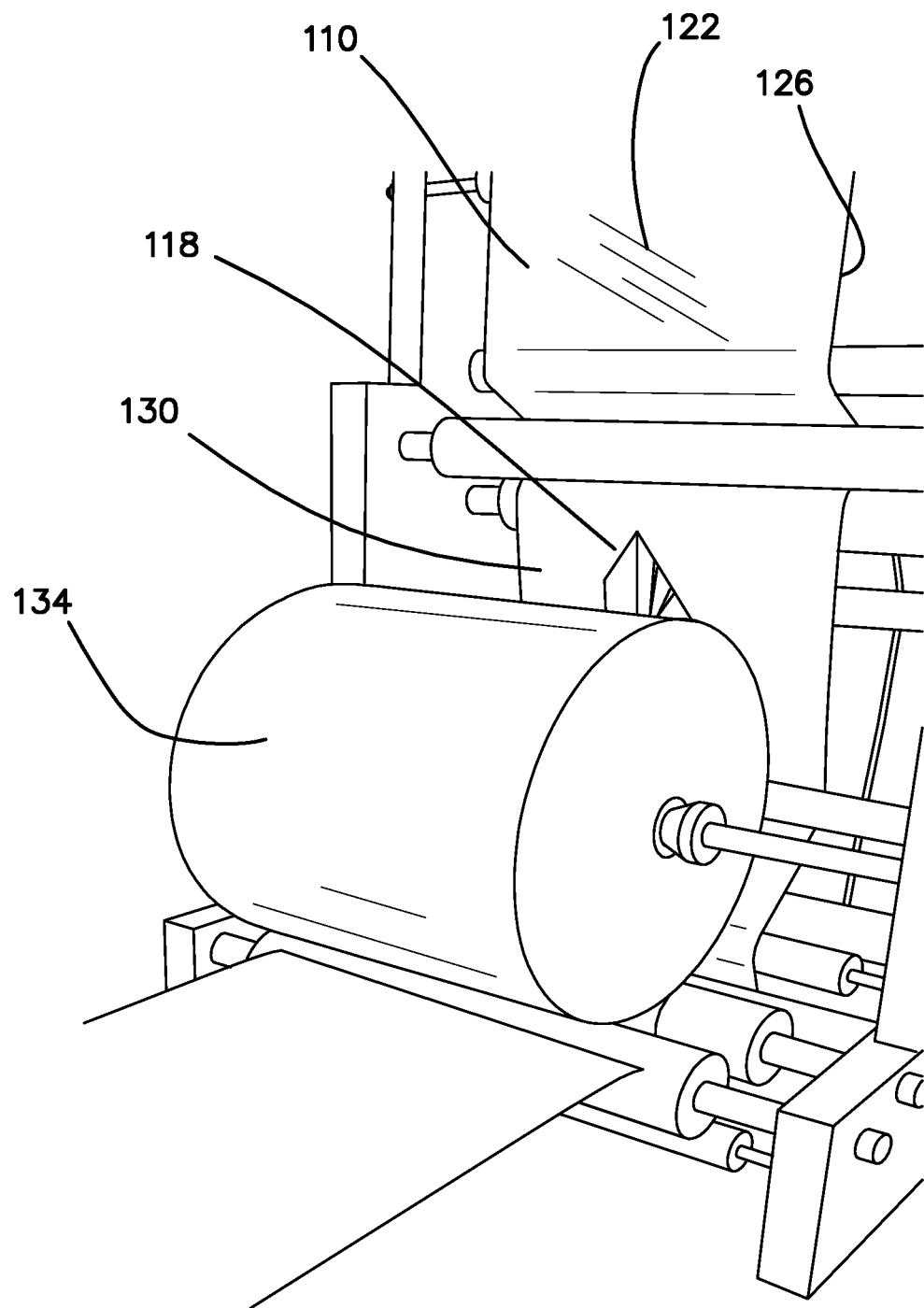
FIG. 13 is a perspective view of equipment for unwinding, printing and rewinding the laminated tubing.

(4) As illustrated in FIGS. 11-13, Extrusion coating/laminating of the woven tube 90 includes the following: Coating upper 98 and lower 102 surfaces of the flattened, woven tube 90 with molten Low Density Polyethylene (LDPE) resin 18. Laminating a layer of Linear Low Density Polyethylene (LLDPE) film 22 onto the molten LDPE resin 18 on each of the upper 98 and lower 102 surfaces of the woven tube 90 using an extrusion coating lamination apparatus 106. Winding the coated and laminated woven tube 110 onto a roll 114 using a third winding machine 116. Optionally unwinding tube 110 from the roll 114, printing a logo or other information 118 on at least one of the upper 122 and lower 126 LLDPE layers. Winding the printed tube 130 onto rolls 134 using a fifth winding machine 132.

Figure 14:
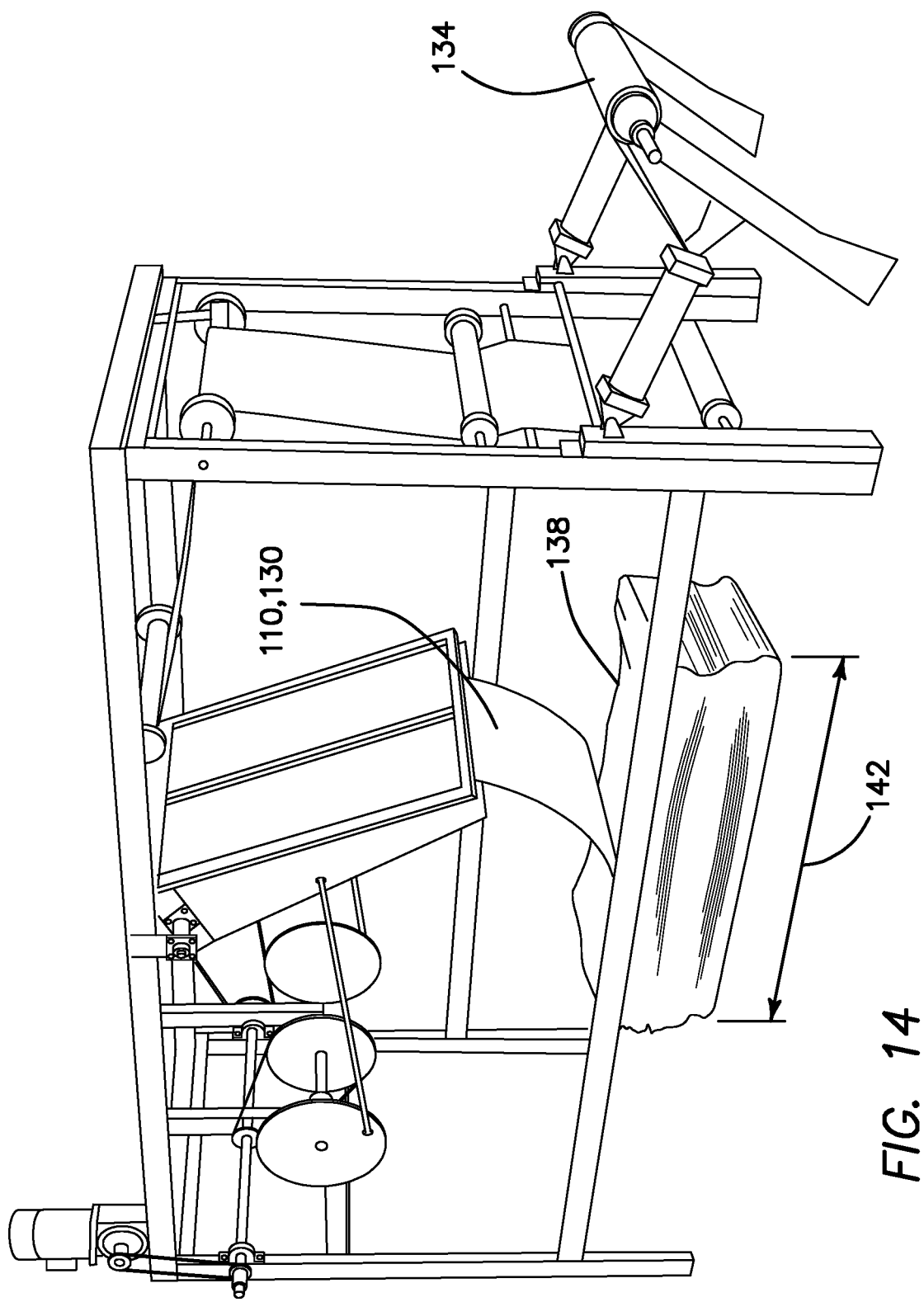
FIG. 14 is a perspective view of equipment for unwinding, folding and stacking the laminated tubing.
Figure 15:
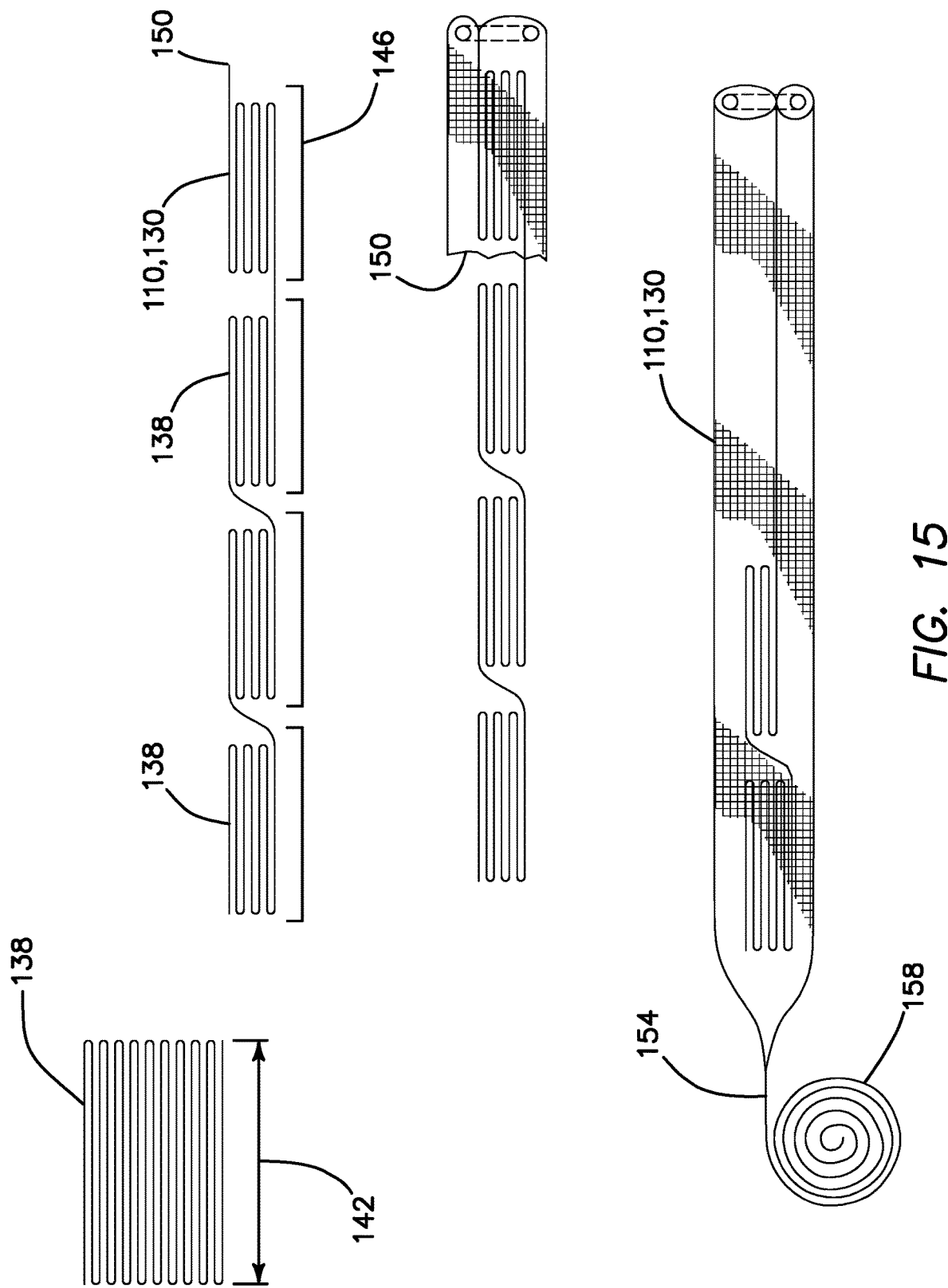
FIG. 15 is schematic side elevational view of the process of turning the tubing inside out over itself and the stacked tubing.
Figure 16:
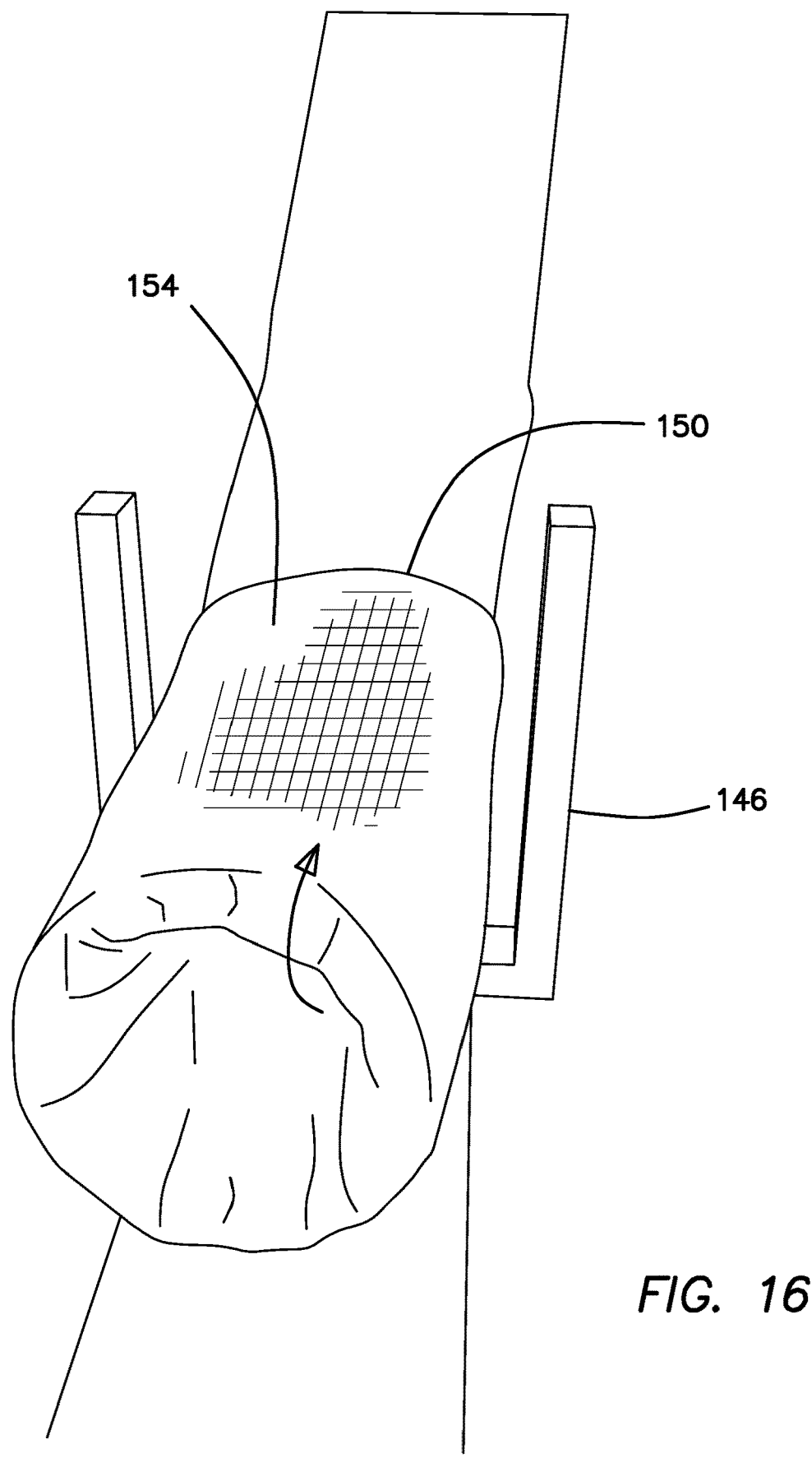
FIG. 16 is a perspective view of the process shown in FIG. 15.

(5) As illustrated in FIGS. 14-16, Reversing and winding of the tube 110 or printed tube 130 includes the following: Unwinding the coated and laminated woven tube 110, 130 from the roll 134 and folding it into linked stacks 138 of a first predetermined size 142. Positioning the linked stacks 138 on a series of support cradles 146. Opening a distal end 150 of the tube 110, 130 and turning the tube 110, 130 back on itself. Pulling the opened distal end 150 of the tube 110, 130 over the stacks 138 and the cradles 146 supporting them. Winding the reversed tube 154 onto a roll 158 using a fourth winding machine (not shown). Covering the roll 158 with a protective layer (not shown) for storage and transport.

The woven irrigation tubing 10, apparatus and method of making same have been described with reference to particular embodiments. Other modifications and enhancements can be made without departing from the spirit and scope of the invention.

The invention claimed is:

1. Woven irrigation tubing comprising:
an inside layer, said inside layer being formed of linear low density polyethylene (LLDPE);
a middle layer, said middle layer being formed of low density polyethylene (LDPE);
an outside layer, said outside layer being formed of woven, seamless high density polyethylene (HDPE); and
said inside layer being laminated to said middle layer and said middle layer being laminated to said outside layer.

2. The woven irrigation tubing of claim 1, wherein said inside layer is formed of LLDPE having a density ranging from 20 to 22 grams/meter$^2$.

3. The woven irrigation tubing of claim 1, wherein said middle layer is formed of LDPE having a density ranging from 20 to 22 grams/meter$^2$.

4. The woven irrigation tubing of claim 1, wherein said outside layer is formed of HDPE woven seamless fabric having a density ranging from 86 to 88 grams/meter$^2$.

5. The woven irrigation tubing of claim 1, wherein said outside layer is formed of HDPE woven seamless fabric having 8 to 14 threads/inch.

6. The woven irrigation tubing of claim 1, wherein said woven irrigation tubing has a finished outer diameter ranging from 8 inches to 24 inches.

* * * * *